United States Patent [19]

Smith

[11] Patent Number: 5,785,860

[45] Date of Patent: Jul. 28, 1998

[54] UPGRADING HEAVY OIL BY ULTRAFILTRATION USING CERAMIC MEMBRANE

[75] Inventor: Kevin J. Smith, Delta, Canada

[73] Assignee: University of British Columbia, Vancouver, Canada

[21] Appl. No.: 710,254

[22] Filed: Sep. 13, 1996

[51] Int. Cl.⁶ .................................................. B01D 61/00
[52] U.S. Cl. .......................... 210/651; 210/653; 210/805; 208/308; 208/309; 585/818
[58] Field of Search .................................. 210/651, 653, 210/805, 650; 208/308, 309, 302; 585/818

[56] References Cited

U.S. PATENT DOCUMENTS

| | | | |
|---|---|---|---|
| 4,411,790 | 10/1983 | Arod et al. | 210/637 |
| 4,617,126 | 10/1986 | Funk et al. | 210/651 |
| 4,750,990 | 6/1988 | Kulkarni et al. | 208/177 |
| 4,797,200 | 1/1989 | Kulkarni et al. | 208/308 |
| 4,814,088 | 3/1989 | Kutowy et al. | 210/500.41 |
| 4,816,140 | 3/1989 | Trambouze et al. | 208/309 |
| 5,173,172 | 12/1992 | Adams et al. | 208/309 |
| 5,234,579 | 8/1993 | Pasternak | 208/308 |
| 5,256,297 | 10/1993 | Feimer et al. | 210/651 |
| 5,430,224 | 7/1995 | Schucker | 210/650 |
| 5,643,442 | 7/1997 | Sweet et al. | 208/302 |

OTHER PUBLICATIONS

44th Canadian Chem. Eng. Conference, Book of Abstracts pp. 649–650, Oct. 2–4, 1994, Calgary, Alberta, Canada "Separation of Diluted Heavy Oil With Inorganic Membranes"=, P. A. Nawrocki, A. Duong and K. J. Smith.

Primary Examiner—Ana Fortuna
Attorney, Agent, or Firm—Millen, White, Zelano & Branigan, P.C.

[57] ABSTRACT

A large pore (500°–2000° A) ceramic membrane is used to separate asphaltenes from heavy crude oil. Permeate is recycled to the feed for an initial period, during which the pores are deliberately fouled to reduce pore size. This reduction eventually levels off, at which point recycling is terminated and ultrafiltration is continued thereafter at good flux rates with effective asphaltenes removal.

8 Claims, 3 Drawing Sheets

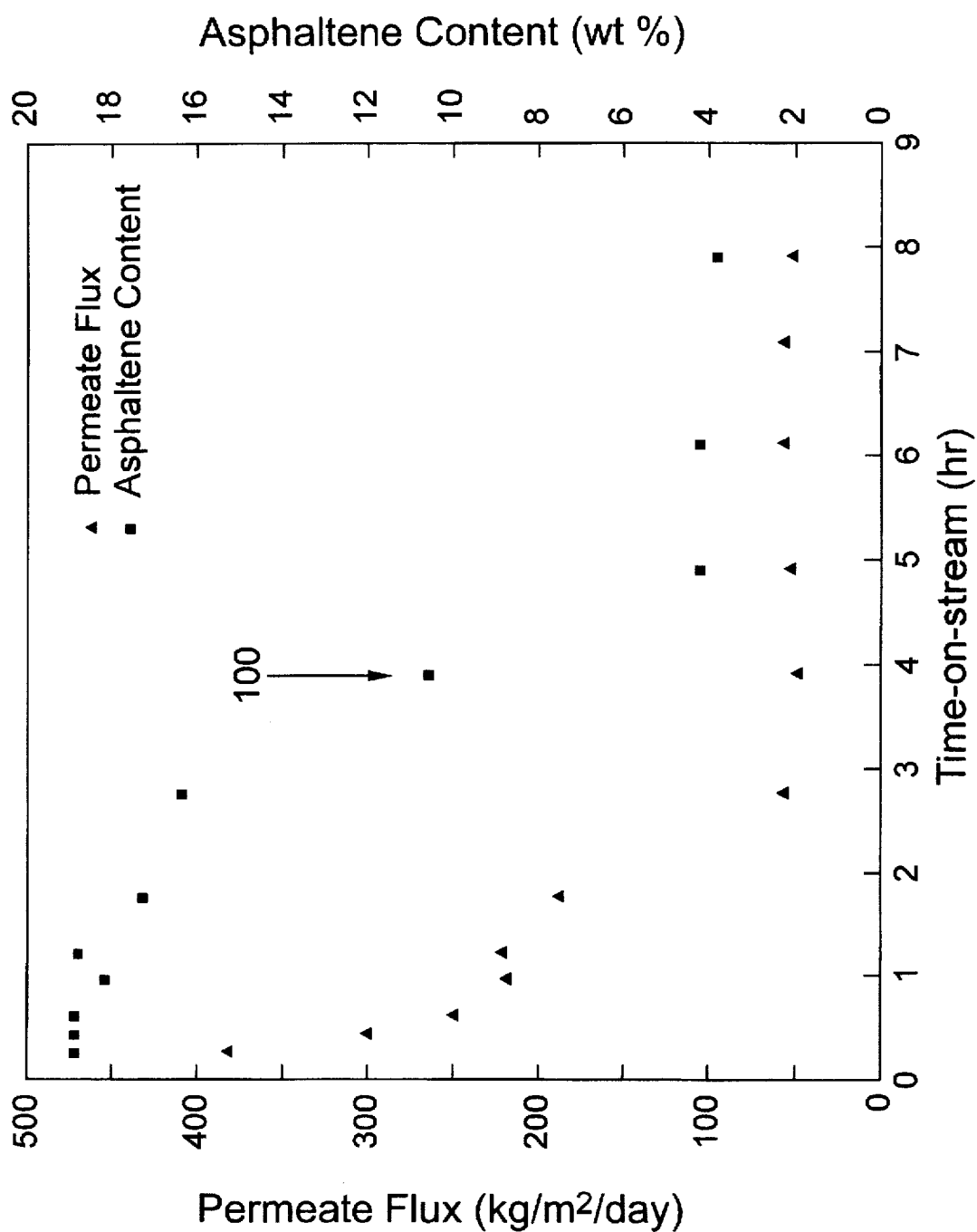

1
UPGRADING HEAVY OIL BY ULTRAFILTRATION USING CERAMIC MEMBRANE

FIELD OF THE INVENTION

The invention relates to a process for the selective removal of asphaltenes and metal complexes associated therewith from heavy oil by ultrafiltration using permeable ceramic membranes.

BACKGROUND OF THE INVENTION

The present invention was developed in connection with experiments carried out to investigate removal of asphaltenes and metals (Ni and V) from heavy crude oil using ceramic membranes.

Heavy crude oil is one form of heavy oil. Heavy oil is defined herein as having a density of about 1000–934 kg/m$^3$ (10° API to 20° API gravity) and a viscosity of about 100–100.000 m Pa. s. The heavy oil may be heavy crude oil, atmospheric and vacuum residue, heavy fuel oil or used heavy oil.

The particular oil used in the experiments was heavy crude oil produced in the Cold Lake area of Alberta. This crude oil typically has the following properties:

PHYSICAL PROPERTIES

| | |
|---|---|
| Density °API | 10.1 |
| Viscosity at 40° C., m Pa. s | 8,887 |
| Viscosity at 80° C., m Pa. s | 425 |

CHEMICAL PROPERTIES

| | |
|---|---|
| Asphaltenes, wt. % | 17.4 |
| Nickel, µg/g | 59 |
| Vanadium, µg/g | 15.4 |

As indicated, this crude oil is high in asphaltene and metal concentrations. This is typical for many heavy oils. It is these oils that the present invention addresses.

In the case of heavy crude oil, certain disadvantages arise from these properties. More particularly:

The high viscosity commonly requires that a diluent must be added before the oil can be pipelined;

The asphaltenes agglomerate and deposit on the surfaces of processing equipment;

The asphaltenes lead to undesired coke formation during hydroprocessing; and

The metals will contribute to catalyst deactivation.

Much research effort has therefore been carried out by the industry to develop useful techniques for reducing the asphaltene and metal contents of heavy oil, particularly crude oil.

Selective separation with permeable membranes is one technology that has been investigated for this purpose. This technique is commonly referred to as "ultrafiltration".

According to Baltus and Anderson, in their paper titled "Hindered Diffusion of Asphaltenes through Microporous Membranes", Chem. Eng. Sci., 38, 1959–1969 (1983), the size of the molecules making up the asphaltenes varies between about 10°–1000° A.

This suggests that the membrane used for separation of asphaltenes should have an average pore size less than 1000° A. In considering what pore size to use, one will weigh that a smaller pore size will increase asphaltene separation but reduce permeate flux. The literature commonly recommends an average pore size of about 250° A or less, if a product of pipeline quality is to be produced. By "pipeline quality" is meant that the oil viscosity will be less than about 500 m Pa.s at 40° C.

Most of the research reported on in the literature has focused on the use of polymeric membranes for separating asphaltenes from heavy oil. As an example, O. Kutowy, P. Guérin, T. A. Tweddle and J. Woods in their paper entitled "Use of Membranes for Oil Upgrading" published in the Proceedings of the 35th Canadian Chemical Engineering Conference, Volume 1, pg 26–30, 1985, reported that Cold Lake crude oil diluted with 34% naphtha and processed using a 3–30 nm pore size polymeric membrane, operated at 45° C. at a pressure 3 MPa, could reduce the oil viscosity from 90 to 2 cp and V and Ni contents from 125 ppm to 5 ppm and from 41 ppm to 0.6 ppm, respectively.

However, polymeric membranes are limited to low temperature (<100° C.) operation, if long membrane life is needed. They are also subject to chemical degradation when exposed to light hydrocarbons.

Given the high viscosity of heavy crude oil, it is desirable to practise ultrafiltration at relatively high temperature and differential pressure. One needs to reduce the viscosity as best one can and increase the pressure to improve flux rate. Additionally, it may be desirable to add a light hydrocarbon diluent to further improve flux rate. For these reasons, polymeric membranes have not won application commercially for ultrafiltration of heavy crude oils.

Some research has been directed to the use of alumina-based ceramic membranes for ultrafiltration of heavy crude oils. These membranes can operate at high temperature and pressure and are quite immune to chemical degradation.

In this connection, the following relevant patents in the literature have been noted.

U.S. Pat. No. 4,411,790, issued to Arod et al on Oct. 25, 1983, teaches:

practising high temperature ultrafiltration on a viscous oil containing asphaltenes, to separate asphaltenes from the oil;

using a non-organic membrane (for example, alumina-coated ceramic) operated at a temperature of 100°–350° C. at a pressure differential of 1–20 relative bars;

the membrane having a radius of permeametry in the order of 50°–250° A.

U.S. Pat. No. 5,256,297 issued to Feimer et al on Oct. 26, 1993, teaches:

practising high temperature ultrafiltration on a viscous oil containing metals and asphaltenes, to lower the metal and asphaltene contents thereof;

using a non-organic membrane operated at a temperature of 100°–500° C. at a pressure differential of 20–500 psig;

the membrane having a pore size of 5°–1000° A, preferably 10°–100° A;

using two sequential stages of separation, each equipped with the same membrane;

optionally using a diluent to assist in reducing the feed viscosity; and optionally recycling the retentate from the second stage to the feed to the first stage.

In summary then, the prior art teaches that temperature and pressure-resistant non-organic membranes can be used to remove asphaltenes and metals from heavy oil to reduce viscosity and upgrade the oil. However, as previously stated, it is indicated that fine pore size (<250° A) is preferred.

There are problems inherent in using ceramic membranes having a pore size in the order of 250° A. For example, the membrane is expensive to fabricate. Furthermore, the flux rate through the membrane is low. And finally, the small pores tend to plug quickly. It is believed that these factors have combined to discourage commercial application of ceramic membrane in the heavy crude oil upgrading field.

It is therefore desirable to develop a ceramic membrane ultrafiltration process in which flux rate, asphaltene reduction and cost are all improved. Preferably, it would be desirable to develop a process wherein the asphaltene content of the heavy crude oil is reduced sufficiently so that the product viscosity meets pipelining specification.

It is the objective of the present invention to provide such a process.

SUMMARY OF THE INVENTION

As previously indicated, the invention is concerned with upgrading heavy oil containing asphaltenes and associated heavy metal complexes by reducing asphaltene and metal contents using ultrafiltration.

The invention is based on using a large pore, initially non-fouled, ceramic membrane and operating it for an initial period during which substantially all of the permeate is recycled to the feed and the membrane is deliberately fouled to reduce the effective membrane pore size. Following this period, recycling is terminated and permeate with reduced asphaltene and metal contents and reduced viscosity is thereafter continuously recovered with a minimal rate of flux decline.

By 'large pore' is meant that the membrane has an initial average pore size greater than about 500° A, preferably in the range 500°–2000° A and most preferably in the range 1000°–2000° A.

As stated, the process incorporates an initial period of operation under conditions of permeate recycle to the feed. During this period the membrane partially fouls and the effective pore size is gradually reduced, with accompanying improvement in separation of asphaltenes and metals. It has been discovered that the diminution of pore size (evidenced by diminishing flux rate) eventually substantially levels off. The permeability condition of the membrane at this levelling off point is such that flux rate is reasonably high and asphaltene separation is good enough to yield a product that can be pipelined. At about the levelling off point, recycling of permeate is terminated. Thereafter ultrafiltration is continued for a prolonged period without recycle, until finally the pores become too small to enable viable operation and backflushing or other regeneration is required to restore the membrane to a substantially non-fouled condition.

By using a membrane with such large pores, the cost of membrane fabrication is significantly reduced and high flux rates are attained.

In summary then, the following benefits are obtained by the practice of the invention:

the viscosity of the oil is reduced, to render it suitable for pipeline conveyance;

the metal and asphaltene contents are reduced, to improve the refinery acceptance of the upgraded oil; and the cost is reduced by providing increased overall flux rate and lower membrane fabrication cost.

Broadly stated, the invention is directed to a process for upgrading heavy oil feed containing asphaltenes, comprising: subjecting the feed to ultrafiltration by feeding it at elevated temperature and pressure through a substantially non-fouled ceramic membrane having a large average pore size to produce permeate and retentate products; recycling a major portion of the permeate product to the feed entering the membrane for sufficient time so that rapid diminution of permeate flux rate begins to substantially level off and the asphaltene content of permeate product being produced is reduced by at least 30% compared to the feed content; and then terminating recycling and continuing to subject additional feed to ultrafiltration.

DESCRIPTION OF THE DRAWINGS

FIG. 3 is a plot, based on Example V, showing flux rate and permeate asphaltene content values over time during a run conducted in accordance with the invention—the curves show a period of initial rapid diminution followed by a period where the values only slowly change or substantially level off. Recycling of permeate is terminated at the interface of these two periods.

DESCRIPTION OF THE PREFERRED EMBODIMENT

In accordance with the process, heavy crude oil is first heated and then pumped through a permeable ceramic membrane unit at high differential pressure using a cross-flow arrangement. Useful conditions are as follows:

pore size: 500°–2000° A feed temperature: 90° C. to boiling temperature of the oil or upper limit of membrane capability differential pressure: 40 psig to maximum allowable differential pressure of the membrane fluid velocity through membrane tube: 1 to 15 ms$^{-1}$ feed flow rate: depends on total surface area of the membrane unit and will be about 1–10 liters/hr. per m$^2$ of available membrane surface membrane capabilities: operable at trans-membrane pressure of 1450 psig and temperature up to 480° C.

Figure 1:
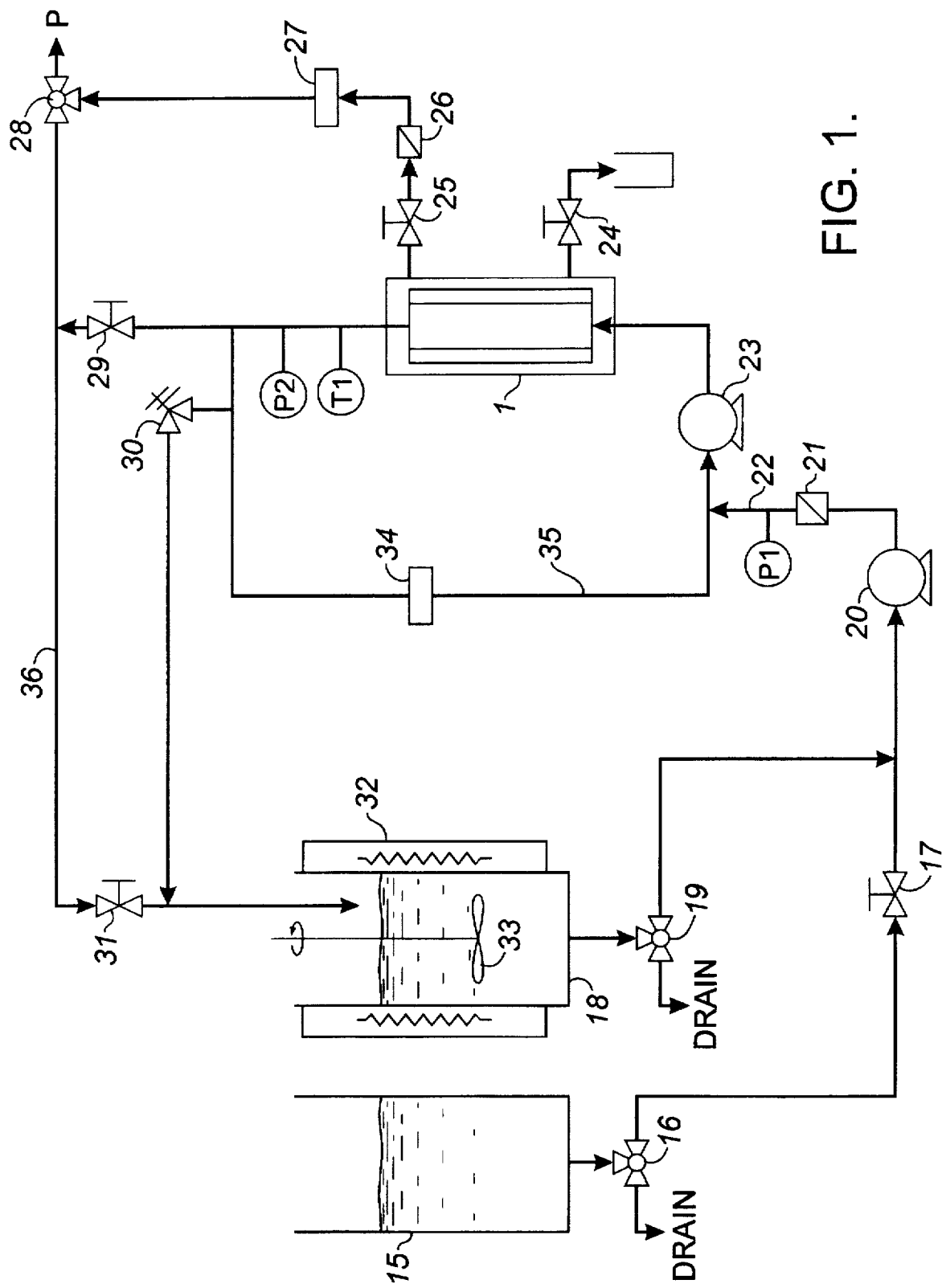
FIG. 1 is a schematic showing the laboratory circuit used in the experiments underlying the invention.
Figure 2:
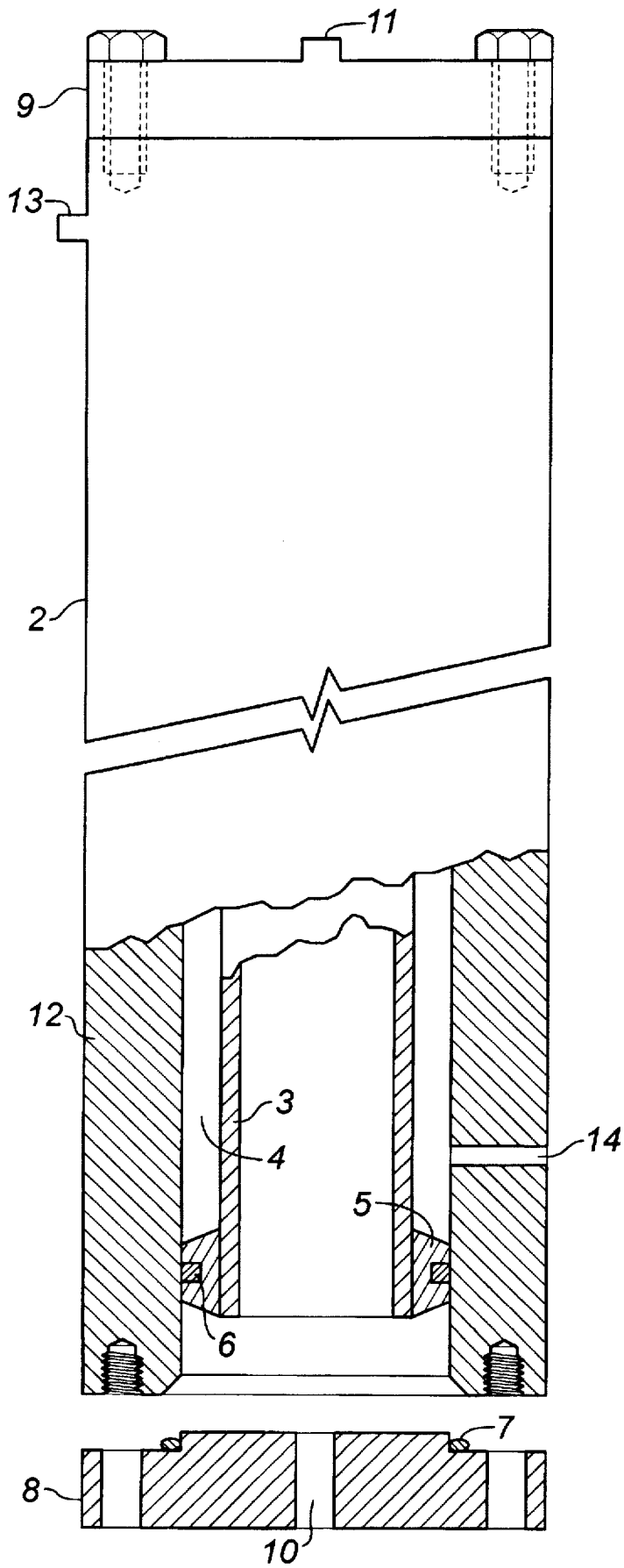
FIG. 2 is a simplified sectional side view showing the membrane module of FIG. 1.

The experiments underlying the invention were carried out in the batch ultrafiltration unit shown schematically in FIG. 1. The unit included a membrane module 1 shown in FIG. 2 and comprising a 5.08 cm O.D.×1.9 cm I.D. tubular steel housing 2 containing a 25 cm long×1 cm O.D. single tube ceramic membrane element 3. The membrane elements used were obtained from United States Filter Corporation of Warrendale, Pa. and are identified by the trade mark MEMBRALOX. The membrane elements were single tube asymmetric ceramic membranes composed of alumina. Each element comprised layered composites, with the outer layer having the smallest pores.

The membrane element 3 was inwardly spaced from the housing wall to form an annulus 4. The open ends of the annulus and housing were closed by ferrules 5 carrying O-ring 6, O-ring 7 and end plates 8, 9. The end plate 8 formed an inlet 10 for feed and the end plate 9 formed an outlet 11 for retentate. The housing side wall 12 formed an outlet 13 for the permeate and an outlet 14 for collecting a permeate sample or draining the permeate side of the module. A first reservoir tank 18, containing heavy crude oil feed, was equipped with a stirrer 33 and was externally heated by an electrical heating band 32. The heavy crude oil feed was delivered through valve 19 to the feed pump 20 and pumped to the internal retentate recycle line 35 through the filter 21 using line 22. A second reservoir tank 15, containing toluene, was also connected to the feed pump through valve 16 and shut-off valve 17. The heavy oil feed and the internal retentate recycle were pumped through the membrane tube at high velocity using the recycle pump 23. The internal retentate recycle rate was monitored using flowmeter 34. During normal operation shut-off valve 29 was closed and the retentate was mostly recycled through line 35 to ensure a high cross-flow velocity in the membrane tube. A small portion of the retentate also flowed through the relief valve 30 that was used to control the pressure in the membrane. The permeate flowed through valve 25, filter 26, flowmeter 27, valve 28 and was recovered at point P of FIG. 1. In addition, a permeate sample could be withdrawn through valve 24. During the initial part of the operation, permeate was recycled to the feed tank by switching valve 28 so that the permeate was returned to the reservoir tank through line 36 and valve 31. Once the permeate asphaltene content was at the desired level, valve 28 was switched so that permeate was recovered at point P.

In the operation of the unit, heavy oil was heated in tank 18 and the membrane unit filled with this oil within 1 minute using the feed pump 20. The unit was purged of trapped air by opening valve 29. Subsequently valve 29 was closed and the recycle pump 23 was started. The relief valve 30 was then adjusted to obtain the desired pressure in the membrane tube. Valve 25 was opened and valve 28 was switched so that permeate was directed through line 36 back to the feed tank. Permeate samples were also withdrawn through valve 24. Once the initial permeate recycle period was complete, valve 28 was switched such that the permeate flow exited at point P.

Most comparisons made in the Tables are based on initial flux. That is, for the case of no permeate recycle initial flux is the flux measured as soon as the membrane unit has reached steady state (about 20 minutes) and for the case of permeate recycle the flux is that flux measured after about 3 hours once the permeate recycle has been stopped.

As shown in FIG. 1, permeate can be recycled to the front end of the membrane unit. Recycling is commenced when a non-fouled membrane is placed in operation and is continued until there is a sharp change in diminution of flux rate. At about this point, (identified by the numeral 100 in FIG. 3), recycling is terminated while ultrafiltration is continued.

Intermittent back-pulsing can be practised by backflowing permeate through the membrane wall to clear the gel layer when it accumulates.

A small amount (<10 wt. %) of a diluent, such as benzene or toluene, can be added to the feed to reduce viscosity, if desired.

The invention is disclosed and supported by the following examples.

Example I

This example compares the results obtained in the first stage of the operation, each conducted under the same conditions with the exception that in one run no permeate was recycled and in the other run all of the permeate was recycled for a preliminary period of 3 hours. The membrane used had an average pore diameter of ~1000° A.

The conditions and data are set forth in Table I.

TABLE I

| | | |
|---|---|---|
| feed temperature: | 120° C. | |
| inlet pressure: | 97 psig | |
| fluid velocity through membrane: | 7–9 m/s | |
| | Run 1 | Run 2 |
| duration of recycle period, hrs. | Nil | 3 |
| feed - Cold Lake crude oil | | |
| asphaltene, wt. % | 18.3 | 18.3 |
| Ni, ppm | 76 | 76 |
| V, ppm | 190 | 190 |
| viscosity @ 40° C., cps | 5,825 | 5,825 |
| API gravity | 10.1 | 10.1 |
| initial permeate sample | | |
| flux, kg/m²/day | 105 | 64 |
| asphaltene, wt. % | 12.6 | 5.3 |
| Ni, ppm | 60 | 35 |
| V, ppm | 151 | 85 |
| viscosity @ 40° C., cps | 1,525 | 710 |
| API gravity | 11.8 | 13.8 |
| % reduction in: | | |
| asphaltenes | 31 | 71 |
| Ni | 21 | 54 |
| V | 21 | 55 |

Example II

This example shows the improvement obtained by permeate recycle in the context of a membrane having an average pore diameter of 500° A.

The conditions and data for two runs carried out at the same conditions, except for recycling, are set forth in Table II.

TABLE II

| | | |
|---|---|---|
| feed temperature: | 120° C. | |
| inlet pressure: | 95 psig | |
| fluid velocity through membrane: | 7 m/s | |
| | Run 1 | Run 2 |
| duration of recycle period (hrs) | Nil | 4 |
| feed - Cold Lake crude oil | | |
| asphaltene, wt. % | 18.3 | 18.3 |
| initial permeate sample | | |
| asphaltene, wt. % | 13.9 | 5.1 |
| % reduction in asphaltenes | 24 | 72 |

Example III

This example compares the results of a run carried out using a 200° A average pore size ceramic membrane, without recycle, and a run carried out with a 1000° A average pore size ceramic membrane, with recycle.

The conditions and data are set forth in Table III.

TABLE III

| | | |
|---|---|---|
| feed temperature: | 120° C. | |
| inlet pressure: | 95 psig | |
| fluid velocity through membrane: | 7–9 m/s | |
| membrane pore size: | 200° A | 1000° A |
| duration of recycle: | Nil | 3 hrs. |

TABLE III-continued feed: Cold Lake crude oil

| | | |
|---|---|---|
| asphaltene, wt. % initial permeate sample | 18.3 | 18.3 |
| flux, kg/m$^2$/day | 34 | 61 |
| asphaltene wt. % | 3.4 | 3.7 |
| % asphaltene reduction | 81 | 80 |

The data of Table III shows that the 1000° A membrane, operated with an initial recycle period, had the same degree of separation as that obtained with the 200° A membrane. However, the flux rate was 61 kg/m$^2$/day with the 1000° A membrane whereas it was only 34 kg/m$^2$/day with the 200° A membrane. Otherwise stated, operation with the large pore membrane using recycle attained a significant increase in permeate flux without loss in asphaltene separation, when compared to the results achieved with the 200° A pore size membrane.

Example IV

This example assesses the rate of diminution of flux rate during and after the initial recycle period.

A run was carried out on Cold Lake crude oil having asphaltene content of 18.3 wt. %. The ceramic membrane used had an average pore size of 1000° A. The oil was at a temperature of 120° C. and pressure of 97 psig when introduced into the membrane. The fluid velocity through the membrane tube was 9 m/s. The permeate was recycled for 2 hours. The run was continued for a total of 8 hours. Table 4 sets forth the permeate flux rates in kg/m$^2$/day, measured at the end of each hour of the run.

TABLE IV

| Time-on-stream hrs | Permeate flux kg/m$^2$/day |
|---|---|
| 0.2 | 360 |
| 0.3 | 316 |
| 0.6 | 301 |
| 0.9 | 314 |
| 1.1 | 88 |
| 1.6 | 61 |
| 2.6 | 51 |
| 3.1 | 49 |
| 4.0 | 53 |
| 4.9 | 59 |
| 5.6 | 60 |
| 6.5 | 55 |
| 8.1 | 58 |

This example shows that within 3 hours the flux rate diminution had levelled off and remained generally constant thereafter.

Example V

This example demonstrates how to determine the duration of the permeate recycle period.

A run was carried out using Cold Lake crude oil having asphaltene content of about 19 wt. %. The run was carried out at a temperature of 120° C. and an inlet pressure of 97 psig. The fluid velocity through the membrane was about 9 m/s. The ceramic membrane had an average pore size of 1000° A.

The run was conducted without permeate recycle. The results are tabulated in Table V.

TABLE V

| Time-on-Stream (hrs) | Permeate flux rate (kg/m$^2$/day) | Permeate asphaltene content (wt. %) | % Reduction |
|---|---|---|---|
| 0.25 | 383 | 18.6 | 0.5 |
| 0.43 | 301 | 18.9 | 0.5 |
| 0.62 | 251 | 18.9 | 0.5 |
| 0.93 | 220 | 18.2 | 4 |
| 1.3 | 223 | 18.8 | 1 |
| 1.8 | 188 | 17.3 | 9 |
| 2.8 | 58 | 16.4 | 14 |
| 3.9 | 49 | 10.6 | 44 |
| 4.9 | 53 | 4.2 | 78 |
| 6.1 | 57 | 4.2 | 78 |
| 7.1 | 56 | — | — |
| 7.9 | 52 | 3.8 | 80 |

The data shows that, after an initial period of about 4 hours, the membrane had operated to achieve an asphaltene reduction of about 70%. The recommended permeate recycle period would be 4 hours in such a case.

Example VI

This example demonstrates that a ceramic membrane having an average pore size of 2000° A can perform as well as one of 1000° A.

Runs were carried out using 1000° A and 2000° A membranes fed with Cold Lake crude oil at a temperature of 160° C. with a pressure of 95 psi. The permeate was recycled for an initial period of 2 hours. The results are reported below.

TABLE VI

| pore size: | 1000° A | 2000° A |
|---|---|---|
| flux (kg/m$^2$/day) | 65 | 70 |
| asphaltene reduction (%) | 75 | 80 |

The data of Table VI are reported for a time of 3 hours recycle plus 3 hours operation (total 6 hours).

The embodiments of the invention in which an exclusive property or privilege is claimed are defined as follows:

1. A process for upgrading heavy oil feed containing asphaltenes, comprising:

subjecting the feed to ultrafiltration by feeding it at elevated temperature and pressure through a substantially non-fouled ceramic membrane having a large average pore size to produce permeate and retentate products;

recycling a mayor portion of the permeate product to the feed entering the membrane for sufficient time so that rapid diminution of permeate flux rate begins to substantially level off and the asphaltene content of the permeate product being produced is reduced by at least 30% compared to the feed content;

terminating recycling and continuing to subject additional feed to ultrafiltration for a prolonged period of time; and recovering permeated heavy oil with low asphaltenes content.

2. The process as set forth in claim 1 wherein:

the average pore size of the membrane is greater than about 500° A.

3. The process as set forth in claim 2, wherein:

the feed is heavy crude oil.

4. The process as set forth in claim 1 wherein:

the average pore size of the membrane is greater than about 1000° A.

5. The process as set forth in claim 4, wherein:

the feed is heavy crude oil.

6. The process as set forth in claim 1 wherein the average pore size of the membrane is in the range of about 1000°–2000° A.

7. The process as set forth in claim 6, wherein:

the fee is heavy crude oil.

8. The process as set forth in claims 1 wherein:

the feed is heavy crude oil.

* * * * *